United States Patent [19]

Ebert et al.

[11] Patent Number: 5,620,498
[45] Date of Patent: Apr. 15, 1997

[54] USE OF FUNGAL MYCELIUM AS A SOIL ADJUVANT

[75] Inventors: Hildegard Ebert, Bad Soden am Taunus; Winfried Schräpler, Schlangenbad, both of Germany

[73] Assignee: Hoechst Aktiengesellschaft, Frankfurt am Main, Germany

[21] Appl. No.: 364,412

[22] Filed: Dec. 23, 1994

Related U.S. Application Data

[63] Continuation of Ser. No. 981,091, Nov. 24, 1992, abandoned.

[30] Foreign Application Priority Data

Nov. 27, 1991 [DE] Germany .................. 41 38 883.6

[51] Int. Cl.⁶ .................. C05F 11/08; C05F 9/04
[52] U.S. Cl. .................. 71/6; 71/9; 71/903; 71/904
[58] Field of Search .................. 71/6, 7, 9, 10, 71/903, 904

[56] References Cited

U.S. PATENT DOCUMENTS

| | | | |
|---|---|---|---|
| 4,539,036 | 9/1985 | Naschberger | 71/903 X |
| 4,755,025 | 7/1988 | Nille | 71/903 X |

FOREIGN PATENT DOCUMENTS

| | | |
|---|---|---|
| 0121493A1 | 10/1984 | European Pat. Off. . |
| 0276479 | 8/1988 | European Pat. Off. . |
| 0337483 | 10/1989 | European Pat. Off. . |
| 0341736 | 11/1989 | European Pat. Off. . |
| 0486932 | 5/1992 | European Pat. Off. . |
| 3106649 | 9/1982 | Germany . |
| 3901510 | 7/1989 | Germany . |

OTHER PUBLICATIONS

CA 92(9):746784 (Abstract) Processing Waste Products and Environmental Pollutants into fadder Additives, Biro et al, Oct. 1979.
"Wastes Find Fertile Field as Low–Cost Plant Nutrients," Chemical Engineering, Aug. 2, 1976.
"Manufacture of Soil Amendments Using Animal Wastes and Calcium Oxide," Chemical Abstracts 114:80554u, Mar. 4, 1991.

*Primary Examiner*—Ferris Lander
*Attorney, Agent, or Firm*—Finnegan, Henderson, Farabow, Garrett & Dunner, L.L.P.

[57] ABSTRACT

A soil adjuvant of fungal mycelium which has been treated with quicklime and a process for the preparation of the soil adjuvant. The soil adjuvant contains at least 10% quicklime, preferably 10–15% quicklime, and in particular 10–11% quicklime.

13 Claims, No Drawings

USE OF FUNGAL MYCELIUM AS A SOIL ADJUVANT

This application is a continuation of application Ser. No. 07/981,091 filed Nov. 24, 1992, now abandoned.

DESCRIPTION

As per Düngemittelgesetz [Fertilizers Act] dated Nov. 15, 1977, soil adjuvants are "substances without an essential nutrient content which influence the soil biologically, chemically or physically, and improve its state or the effectiveness of fertilizers, and are, in particular, soil inocula, agents which improve the crumbly texture of the soil, soil stabilizers (chemical hardeners) and ground minerals".

An improvement in the soil structure (crumbly texture, degree of loosening, permeability to gas, water-binding capacity) is brought about, for example, by lime, humus, peat, lignin derivatives, alginates, pectins, iron sulfates, calcium polysulfide, sawdust, silicates and by red mud possibly treated with water glass (Chem. Techn. 29 (1977) 576 and Chem. Ind. 27 (1975) 351). Synthetic products, mainly partially hydrolyzed polyacrylonitrile, vinyl acetate copolymers, polyvinyl propionate, butadiene/styrene copolymers, carboxymethylcellulose and organic ferric ammonium complexes are more important (Römpp, Chemie Lexikon, (1990)).

European Patent 121,493 describes a process for improving the vegetation in the soil with the aid of a mixture of polybutadiene and fungal mycelium. The addition of the fungal mycelium allows the amount of polybutadiene to be reduced. For treating acidic soils, it is recommended that lime (90–95% $CaCO_3$) is additionally admixed.

The present invention relates to a soil adjuvant of fungal mycelium which has been treated with quicklime (CaO).

Fungal mycelium can be used as a soil adjuvant when the fungal mycelium is treated with at least 10% of quicklime. Even though over 20% of quicklime can be added, it no longer makes sense economically. 10–15% of quicklime are preferably added, in particular 10–11% of quicklime. Quicklime contains approximately 92–99.5% of CaO (Wuhrer in Chem. Ing. Techn. 1958, pp. 19–30). This increases the dry matter of the product to a value of between 40 and 60%.

Fungi which are suitable as the fungal mycelium are preferably those which are combined in the artificial group of the Deuteromycetes, also termed Fungi imperfecti; in particular representatives from the genus of the Moniliales. Substantial amounts of fungal mycelium are produced mainly when antibiotics, enzymes or other metabolites are obtained by means of biotechnology.

The fungus *Acremonium chrysogenum* (previously termed *Cephalosporium acremonium*), which produces the antibiotic cephalosporin C, is employed on an industrial scale for obtaining the antibiotic. It is exceedingly desirable to utilize the fungal biomass obtained in this process, so as to reduce the amount of waste in this manner.

The invention furthermore relates to a process for the preparation of this soil adjuvant. The soil adjuvant, which has been prepared from fungal mycelium and quicklime, has the advantage of being largely free from microorganisms and completely free from antibiotics. It can be prepared without the addition of a further synthetic product.

To prepare the product, fungal mycelium and nutrient medium are separated by filtration, it being advantageous to use vacuum rotary filters or similar apparatus. It is expedient to employ a filtering adjuvant, for example ®Filterperl, manufactured by Perlite. Filterperl is manmade kieselguhr and, in contrast to natural siliceous earths, has the advantage of being dust-free. The filter cake formed in this process is mixed with the quicklime while still moist, it being possible to use mixing screws or other suitable apparatus for this purpose.

In this manner, a product is obtained which has a good shelf life and a crumbly consistency and which can be applied easily using muckspreaders. It is particularly suitable for acidic soils. This soil adjuvant is applied at the rate of approximately 10–15 t/ha.

This addition of lime allows the pH of the soil adjuvant to rise to 10–12 and thus causes a stabilization of the mycelium cake, i.e. the product can be transported to landfill sites and stored like domestic waste.

The crumbly, pale gray to grayish-yellow product can be used immediately, or covered and then stored over a prolonged period, or else composted after the addition of additives.

An analysis of the product revealed that the heavy metal contents were far below the values obtained with sewage sludge and also far below the average values of agriculturally utilized soils.

The examples which follow are intended to illustrate the invention without imposing any limitation.

EXAMPLES

1. Using a mixing screw, filter cake obtained from the mycelium of *Acremonium chrysogenum* was mixed with 11% of technical-grade quicklime. In this manner, a crumbly substance is obtained, whose fresh matter has the following composition:

| | |
|---|---|
| Dry matter | 44.1% |
| Nitrogen | 1.38% |
| Phosphorus $P_2O_5$ | 0.36% |
| Potassium $K_2O$ | 0.064% |
| Calcium CaO | 11.1% |
| Magnesium MgO | 0.11% |

2. Comparison of the composition of fungal mycelium of *Acremonium chrysogenum* which had been treated with quicklime (CPC mycelium) with sewage sludge and with agriculturally utilized soils:

| | | In the dry matter: | |
|---|---|---|---|
| | CPC mycelium | Sewage sludge | Agriculturally utilized soils |
| Lead | <2 mg/kg | (1200) | (38) |
| Cadmium | <0.2 mg/kg | (20) | (0.35) |
| Chromium | 10 mg/kg | (1200) | (36) |
| Copper | 13 mg/kg | (1200) | (22) |
| Nickel | 1.5 mg/kg | (200) | (34) |
| Mercury | <0.02 mg/kg | (25) | (0.12) |
| Zinc | 25 | (3000) | (90) |
| pH | 12.5 | | |

Organic substance (loss on ignition) in the dry matter 9.76%.

3. Using a mixing screw, filter cake obtained from the mycelium of *Acremonium chrysogenum* was mixed with 11% of technical-grade quicklime. The product obtained (CPC mycelium) together with various additives was used for the production of compost:

a) 100 tonnes of CPC mycelium +100 tonnes of sewage sludge (40% of DM)+100 tonnes of bark chippings Compost clamp 30 m in length, 2 m in height Composting period: February to September 91.

The clamp was turned over several times.

b) 500 tonnes of CPC mycelium+500 tonnes of potatoes

Compost clamp 45 m in length, 2 m in height

Composting period: January to September 91.

C) 340 tonnes of CPC mycelium +400 tonnes of various waste products (straw, old compost, silo covers, cereal waste products, topsoil)

Compost clamp 30 m in length, 2 m in height

Composting period: May to September 91.

We claim:

1. A soil adjuvant, which consists essentially of a fungal mycelium treated with at least 10% of quicklime, said soil adjuvant having a moisture content of 40–60%.

2. A soil adjuvant as claimed in claim 1, wherein the amount of quicklime is 10–20%.

3. A soil adjuvant as claimed in claim 1, wherein the fungal mycelium is derived from Deuteromycetes.

4. A soil adjuvant as claimed in claim 1, wherein the fungal mycelium is derived from *Acremonium chrysogenum*.

5. A process for the preparation of a soil adjuvant having a moisture content of 40–60%, which consists essentially of separating a fungal mycelium obtained in the fermentation of microorganisms, and intimately mixing the separated fungal mycelium with 10–20% of quicklime.

6. A process for improving soil quality which consists essentially of applying a soil adjuvant having a moisture content of 40–60% and comprising a fungal mycelium treated with at least 10% of quicklime.

7. A process for improving soil quality as claimed in claim 6, which comprises applying the soil adjuvant in an amount between 10 t/ha and 15 t/ha.

8. A process for producing compost, which consisting essentially of forming a treating soil adjuvant having a moisture content of 40–60% and comprising a fungal mycelium treated with at least 10% of quicklime treated with composting the treated soil adjuvant.

9. A soil adjuvant as claimed in claim 2, wherein the amount of quicklime is 10–15%.

10. A soil adjuvant as claimed in claim 9, wherein the amount of quicklime is 10–11%.

11. A process for the preparation of a soil adjuvant as claimed in claim 5, wherein said separation of the fungal mycelium comprises adding a filtering auxiliary and forming the separated fungal mycelium into a filter cake.

12. A process for the preparation of a soil adjuvant as claimed in claim 11, wherein said filter cake is mixed with 10–15% of quicklime.

13. A process for the preparation of a soil adjuvant as claimed in claim 12, wherein said filter cake is mixed with 10–11% of quicklime.

* * * * *

UNITED STATES PATENT AND TRADEMARK OFFICE
CERTIFICATE OF CORRECTION

PATENT NO. : 5,620,498
DATED : April 15, 1997
INVENTOR(S) : Hildegard EBERT et al.

It is certified that error appears in the above-indentified patent and that said Letters Patent is hereby corrected as shown below:

Claim 8, column 4, line 11, "treating" should read --treated--.

Claim 8, column 4, lines 9-10 "consisting essentially of" should read --comprises--.

Claim 8, column 4, line 12, "comprising" should read --consisting essentially of--.

Signed and Sealed this

Sixth Day of January, 1998

Attest:

BRUCE LEHMAN

Attesting Officer

Commissioner of Patents and Trademarks